US007861741B2

(12) United States Patent  
Kress

(10) Patent No.: US 7,861,741 B2
(45) Date of Patent: Jan. 4, 2011

(54) HYDRAULIC FLOW CONTROL VALVE WITH FLOW RATE SETTING ADJUSTABILITY

(75) Inventor: Michael Paul Kress, Dubuque, IA (US)

(73) Assignee: Deere & Company, Moline, IL (US)

( * ) Notice: Subject to any disclaimer, the term of this patent is extended or adjusted under 35 U.S.C. 154(b) by 838 days.

(21) Appl. No.: 11/511,649

(22) Filed: Aug. 29, 2006

(65) Prior Publication Data

US 2007/0045585 A1    Mar. 1, 2007

Related U.S. Application Data

(60) Provisional application No. 60/712,260, filed on Aug. 29, 2005.

(51) Int. Cl.
*F16K 3/32* (2006.01)
(52) U.S. Cl. ............... 137/556.3; 251/285; 251/297
(58) Field of Classification Search ........... 251/284, 251/285, 297; 137/553, 556.3, 556.6, 625.65, 137/625.25
See application file for complete search history.

(56) References Cited

U.S. PATENT DOCUMENTS

| | | | | |
|---|---|---|---|---|
| 1,937,246 A | * | 11/1933 | Reedy | 251/86 |
| 3,272,218 A | * | 9/1966 | Johnson | 137/102 |
| 3,523,162 A | * | 8/1970 | Streit | 379/39 |
| 3,927,830 A | | 12/1975 | Briski | |
| 4,457,341 A | * | 7/1984 | Aspinwall | 137/625.48 |
| 4,588,163 A | * | 5/1986 | Christensen | 251/285 |
| 4,693,272 A | | 9/1987 | Wilke | |
| 5,623,968 A | * | 4/1997 | Thorp | 137/625.66 |
| 5,836,333 A | * | 11/1998 | Haynes | 137/1 |
| 6,345,804 B1 | * | 2/2002 | Martin et al. | 251/129.15 |
| 2005/0127314 A1 | * | 6/2005 | Piehl et al. | 251/129.04 |

OTHER PUBLICATIONS

Information About Hydraulic Flow Control Valve from John Deere Parts Catalog, Catalog 2756, Grid 313, Section 3362, p. 20 (2 Sheets) (1998).
Information About Hydraulic Flow Control Valve from John Deere Parts Catalog, Catalog 2755, Grid 5G3, Section 3362, p. 20 and Photo-Image of Valve (3 Sheets) (1998).
Information About Hydraulic Flow Control Valve from John Deere Parts Catalog, Catalog 2819, Grid 3E1, Section 3362, p. 28 and Photo-Image of Valve (3 sheets) (2001).
Great Britain Search Report dated Oct. 26, 2006 (3 pages).

* cited by examiner

*Primary Examiner*—John Bastianelli

(57) ABSTRACT

A hydraulic flow control valve allowing easy adjustment of fluid flow for a variety of hydraulic attachments is disclosed. The hydraulic flow control valve comprises a spool and a flow rate setting adjustment device configured to adjust a flow rate setting of the hydraulic flow control valve by adjusting the amount of travel allowed for the spool. An associated method of operating the hydraulic flow control valve is disclosed.

13 Claims, 6 Drawing Sheets

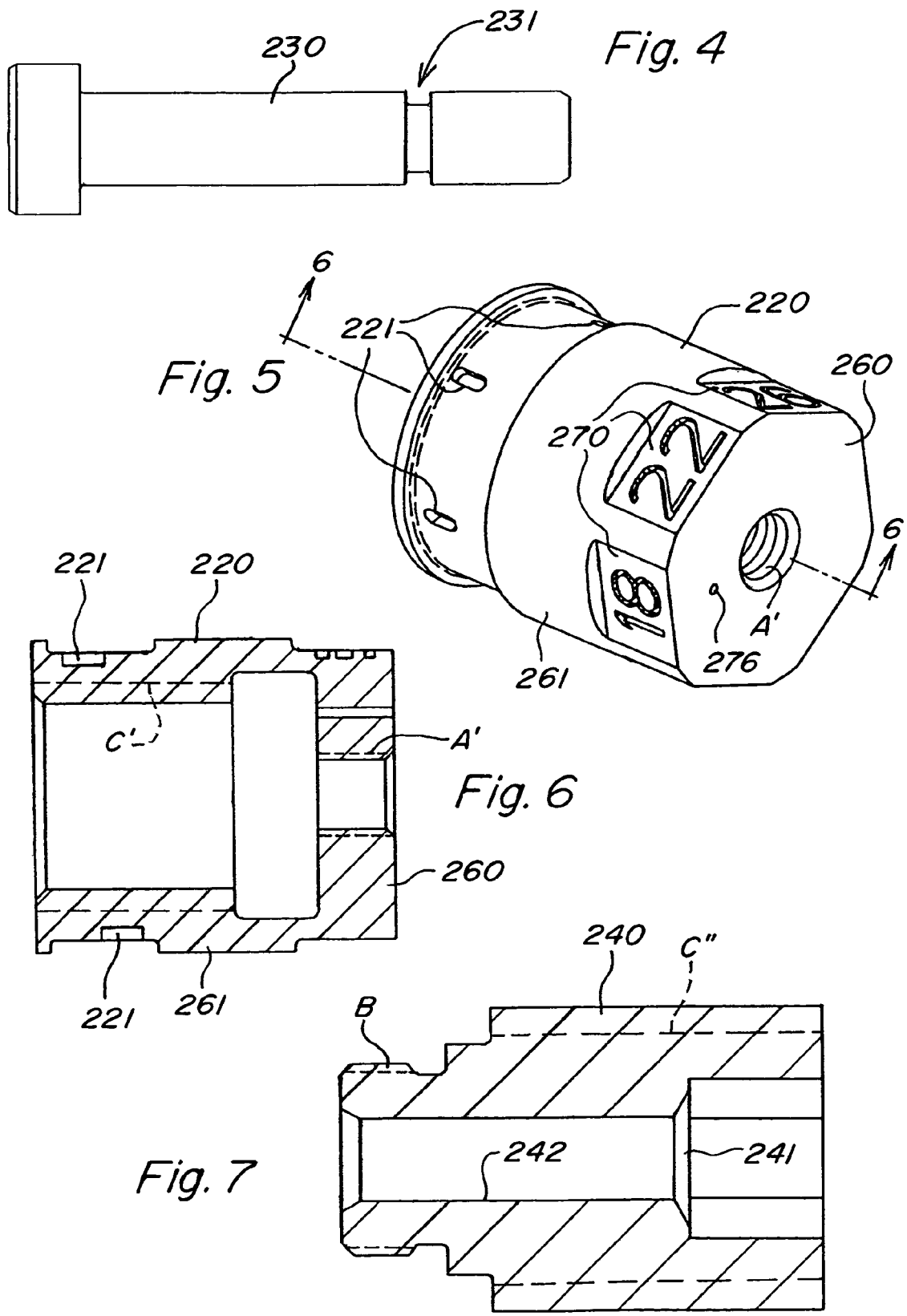

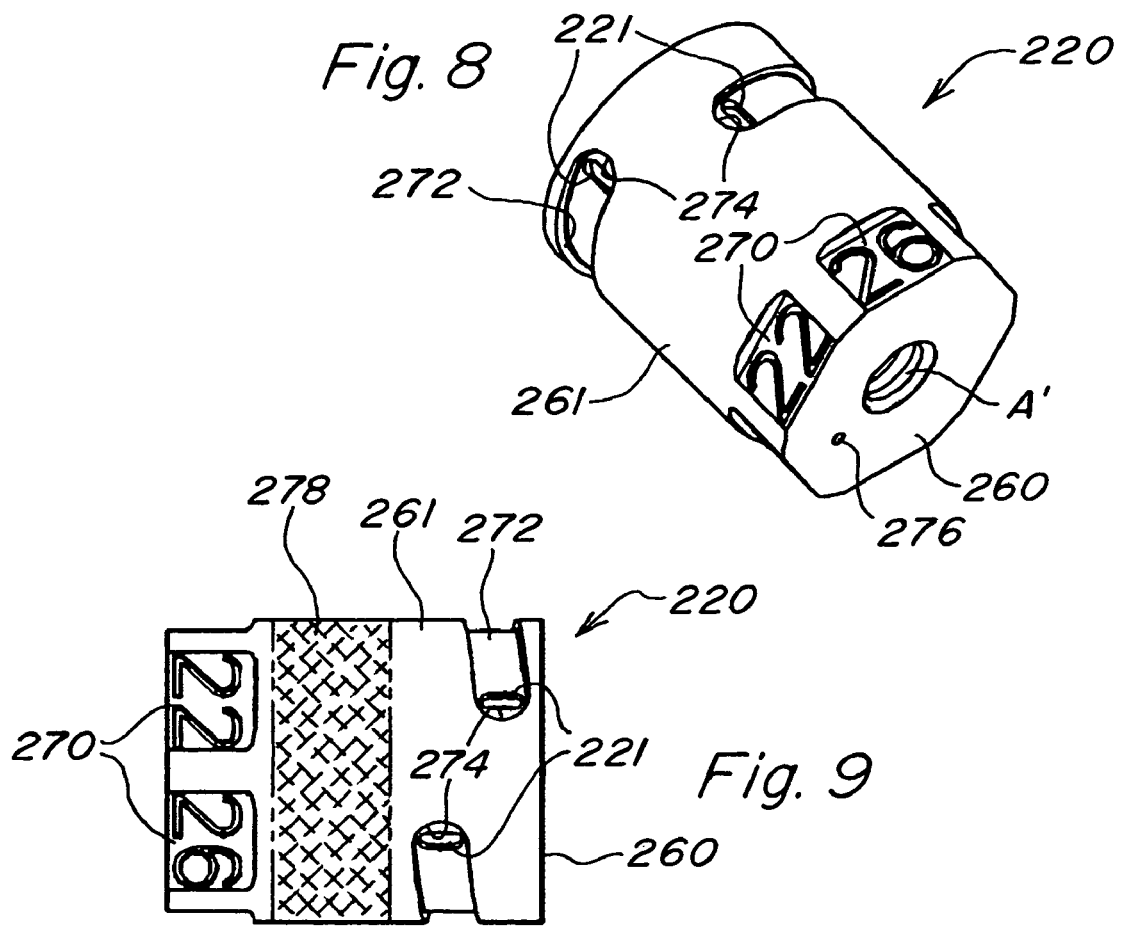
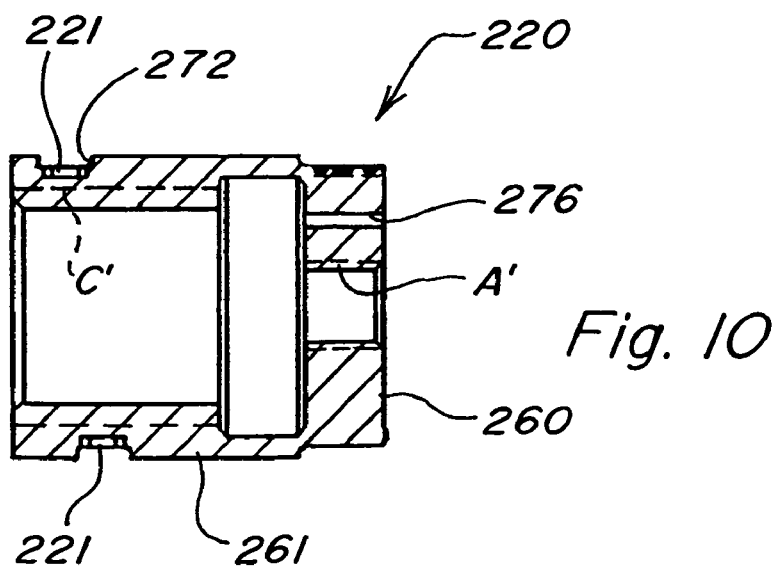

HYDRAULIC FLOW CONTROL VALVE WITH FLOW RATE SETTING ADJUSTABILITY

This application claims the benefit under 35 U.S.C. §119 (e) of U.S. Provisional Patent Application No. 60/712,260 which was filed Aug. 29, 2005 and is hereby incorporated by reference herein.

FIELD OF THE DISCLOSURE

The present disclosure relates to hydraulic flow control valves. More specifically, the present disclosure relates hydraulic flow control valves that can be adjusted to various flows suitable for running a variety of hydraulic attachments such as, for example, hammers, compactors, hand held tools, etc.

BACKGROUND OF THE DISCLOSURE

There are hydraulic flow control valves which can be adjusted to allow proper flow for a variety of attachments. Such hydraulic flow control valves have been used with the backhoe portion of some backhoe loaders.

Some hydraulic flow control adjustment arrangements are not user friendly and often must take place at a dealer with the use of a flow meter to adjust to the exact flow required. For example, there is a closed-center, pressure-compensated, load-sense, auxiliary flow control valve used with a piston pump. The valve has a spool and an adjustable spool stop to provide any flow setting between 13 gpm (i.e., gallons per minute) and 35 gpm. The adjustment is made using a standard capscrew, but requires use of a flow meter.

Some other hydraulic flow control valves have a rotary knob with discrete flow rate settings, but typically involve switching between different size orifices by rotating the knob to select the proper flow rate setting for the hydraulic attachment. In some examples, an open-center auxiliary flow control valve used with a gear pump has a six-position rotary knob that uses orifices to determine the flow rate to the work port (e.g., 9, 13, 16, 18, 22, 25 gpm). In other examples, a stand-alone auxiliary flow control valve uses a rotary knob with eight flow rate settings that switches between eight different orifice sizes (e.g., 9, 13, 16, 18, 22, 26, 30, 35 gpm).

SUMMARY OF THE DISCLOSURE

According to the present disclosure, there is provided a hydraulic flow control valve and an associated method of operation. The hydraulic flow control valve comprises a spool and a flow rate setting adjustment device configured to adjust a flow rate setting of the hydraulic flow control valve by adjusting the amount of travel allowed for the spool.

The flow rate setting adjustment device may have, for example, an adjustable spool stop and a rotary control. In such a case, the flow rate setting adjustment device is configured to adjust a flow rate setting of the hydraulic flow control valve by adjusting the amount of travel allowed for the spool in response to axial position adjustment of the spool stop caused by screw-type movement of the rotary control ("screw-type movement" being defined as rotation about, and axial movement on, the same axis). In particular, the adjustable spool stop is arranged for contact with the spool to establish an axial location of an adjustable end of the travel range of the spool. The rotary control is associated with the spool stop to move the spool stop axially relative to the spool to selectively change the axial location of the adjustable end in response to actuation of the rotary control, thereby adjusting the flow rate setting of the valve.

The flow rate setting adjustment device may include a flow rate setting indicator arranged for screw-type movement with the rotary control to indicate the flow rate setting upon axial position adjustment of the spool stop caused by screw-type movement of the rotary control. The flow rate setting indicator may come in the form of visual indicia or markings on the rotary control. In other examples, the flow rate setting indicator may be configured so as to provide tactile feedback of the flow rate settings of the valve by virtue of a stop arrangement establishing predetermined helically-spaced stop points corresponding respectively to the flow rate settings of the valve. Flow rates may also be sensed or measured by an angle sensor as the rotary control is turned through an angle. The rotary control may comprise a multi-start thread so as to provide a relatively large axial position adjustment of the spool stop for a given amount of screw-type movement of the rotary control.

Such arrangements allow a user friendly adjustment of the valve for any flow capacity or setting for which it is capable. Further, such adjustments may be made in the field by the end user.

The above and other features will become apparent from the following description and the attached drawings.

BRIEF DESCRIPTION OF THE DRAWINGS

Embodiments of the invention will be described in detail, with references to the following figures, wherein:

FIG. 4 is an elevation view of a spool stop for use with the flow rate setting adjustment device;

FIG. 5 is an oblique view of a rotary control for use with the flow rate setting adjustment device;

FIG. 6 is a cross sectional view taken along lines 6-6 of FIG. 5;

FIG. 7 is a cross sectional view of a body for use with the flow rate setting adjustment device;

FIG. 8 is an oblique view of an alternative rotary control for use with the flow rate setting adjustment device;

FIG. 9 is an elevational view of the rotary control of FIG. 8;

FIG. 10 is a sectional view taken along lines 10-10 of FIG. 8;

DETAILED DESCRIPTION OF THE DRAWINGS

Figure 1:
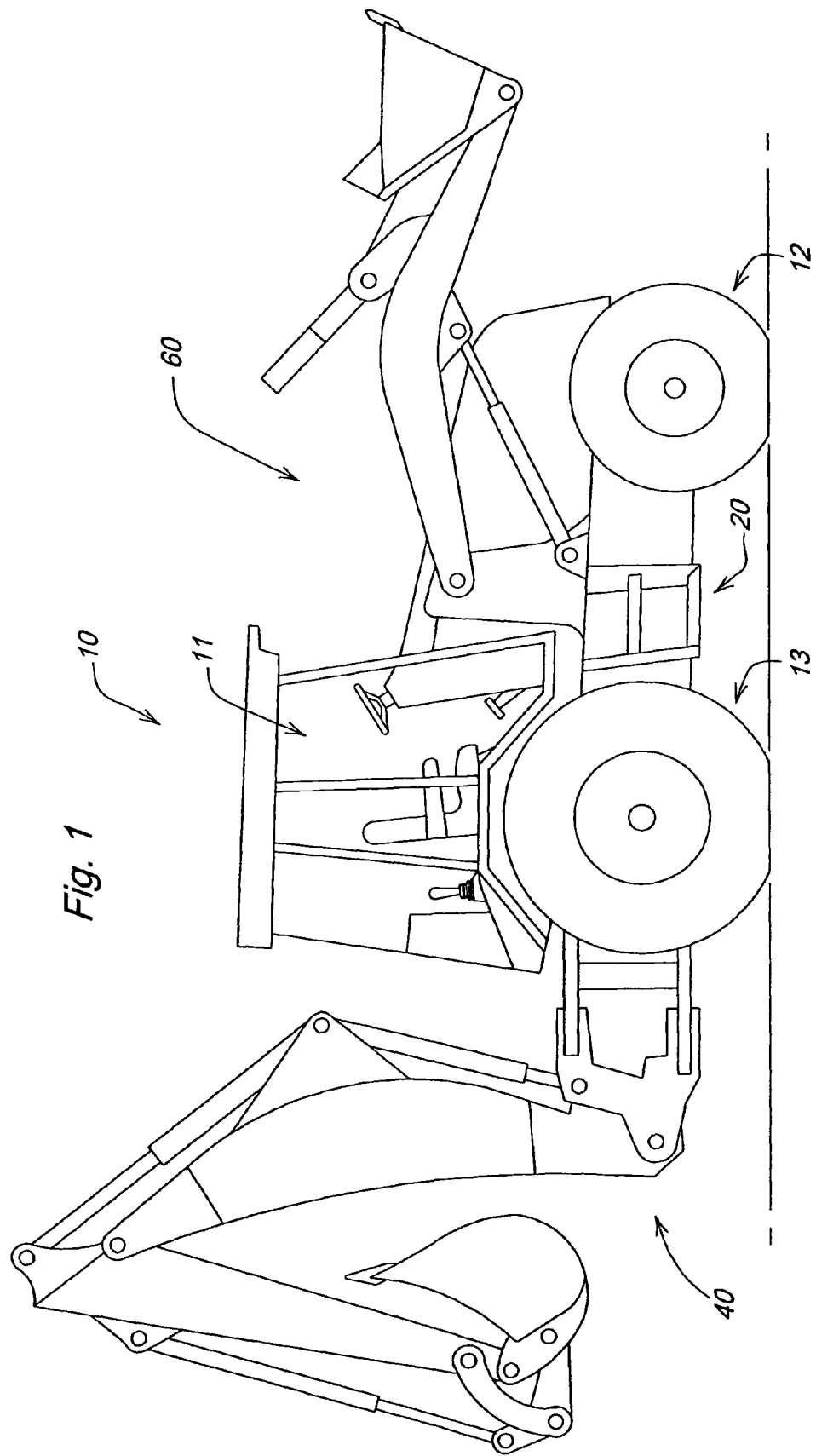
FIG. 1 is a side view of a work vehicle.

Referring to FIG. 1, there is shown a work vehicle 10 embodied, for example, as a backhoe loader which, typically, has dual functions. The functions of the particular work vehicle 10 illustrated are that of a backhoe and that of a loader. The work vehicle 10 includes a cab 11, a main frame 20, a backhoe portion 40 and a loader portion 60. It also includes wheels 12 and 13 as well as a propulsion system (not shown) that propels it along the ground in a manner well known in the art.

Figure 2:
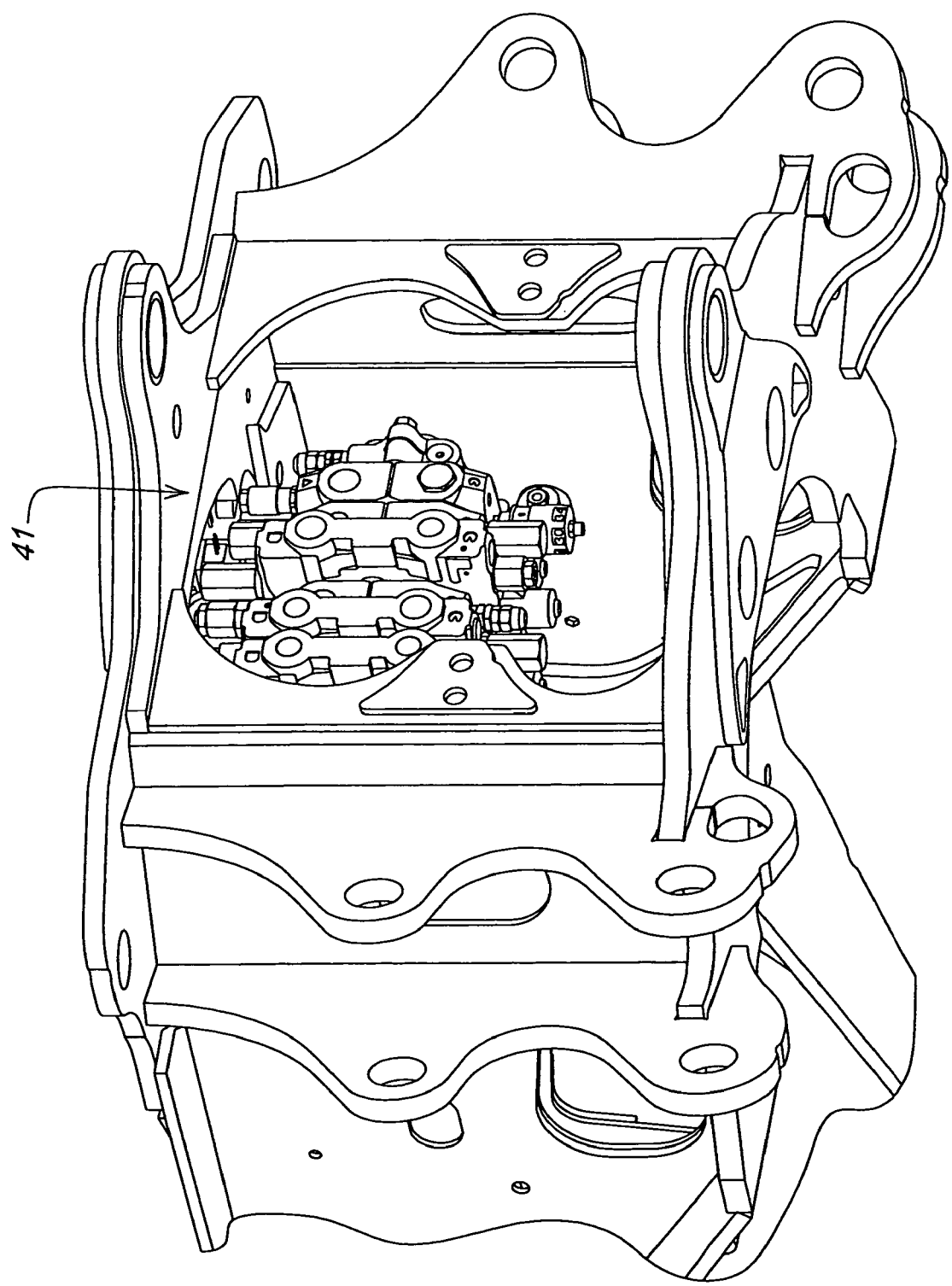
FIG. 2 is an oblique view from a right side of the rear portion of the vehicle illustrated in FIG. 1 illustrating an exemplary location for a hydraulic flow control valve.

Referring to FIG. 2, the backhoe loader includes hydraulic flow control valves 41 in the backhoe portion 40. The backhoe loader is capable of receiving and powering several types of attachments. However, some compatible attachments may have different flow control parameters, i.e., flow rates, for effective and efficient operation. Conventional flow control valves include flow adjustment mechanisms but adjustments can be complex and may often require adjustment by dealers and or repair shops as equipment such as flow meters may be needed to verify adjustments.

Figure 3:
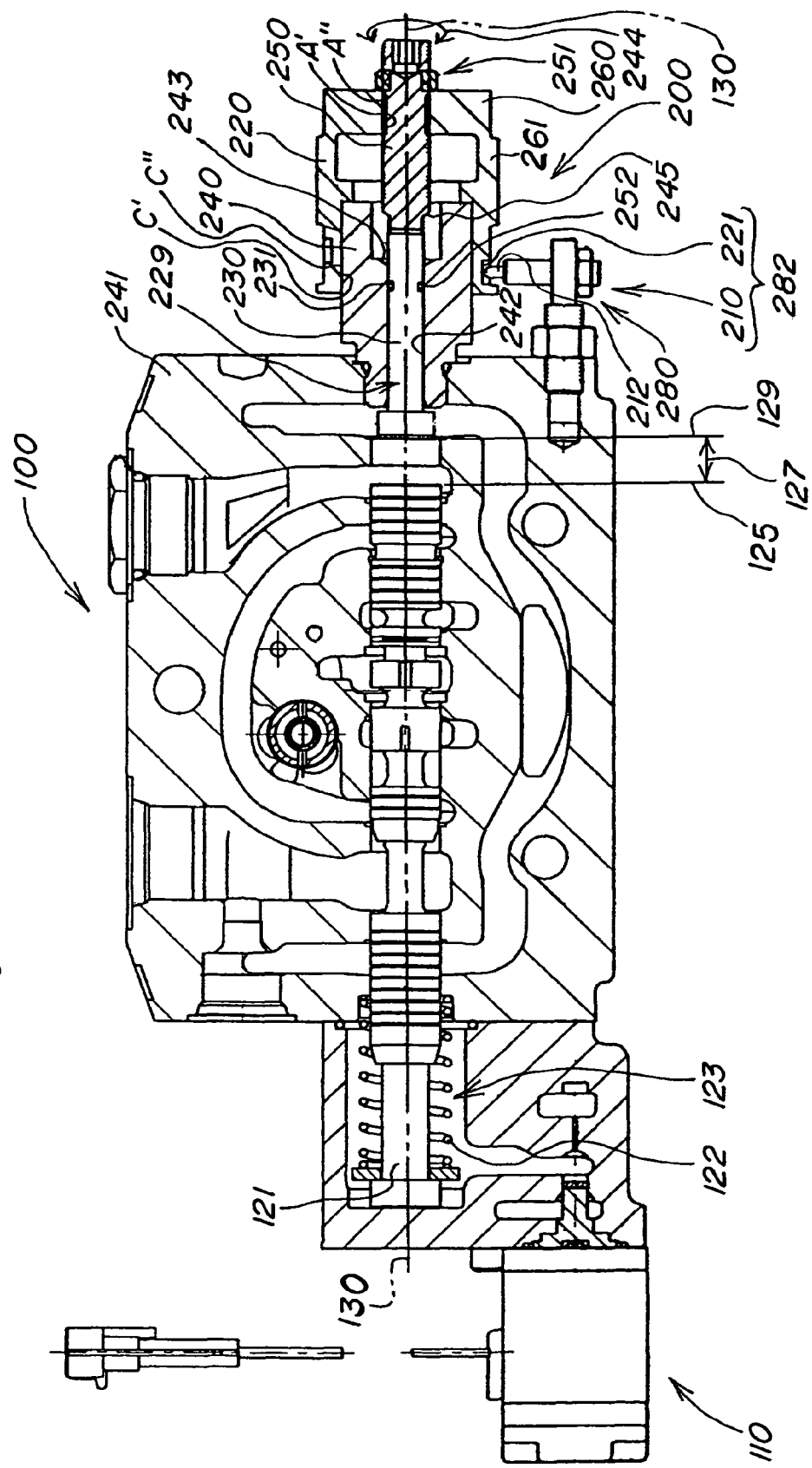
FIG. 3 is a cross section of a hydraulic flow control valve with a flow rate setting adjustment device for adjusting a flow rate setting of the valve.

Referring to FIG. 3, a hydraulic flow control valve 100 may be used as any of the valves 41 of the backhoe loader. The valve 100 is calibrated to allow predetermined flow rates corresponding to predetermined flow rate settings of the valve 100. When an operator of the vehicle 10 changes the hydraulic attachment on the vehicle 10 from one attachment to another, this may require an adjustment in the amount of flow to be provided by the valve 100. In such a case, the operator may readily adjust the flow rate setting of the valve 100 to change the flow rate provided by the valve 100 for operation of the current hydraulic attachment.

The valve 100 includes a solenoid 110, a spool assembly 100, and a flow rate setting adjustment device 200. The spool assembly 100 includes a spool 121 and a biasing spring 122. The biasing spring 122 biases the spool 121 axially to the left relative to an axis 130, i.e., away from a spool stop 229 of the flow rate setting adjustment device 200, toward a fixed end 125 of a spool travel range 127 of the spool 121, the length of the spool travel range 127 defining the amount of travel allowed for the spool 121. When the solenoid 110 is energized, oil under pressure flows into the spring cavity 123 and pushes the spool 121 toward an adjustable end 129 of the spool travel range 127 into contact with the spool stop 229.

Flow adjustments for various types of attachments are effected by adjusting the amount of travel allowed for the spool. In particular, the flow rate setting adjustment device 200 is configured to adjust the flow rate setting of the hydraulic control valve 100 by adjusting the amount of travel allowed for the spool 121.

Illustratively, the flow rate setting adjustment device 200 includes the adjustable spool stop 229 and a control 220. In such a case, the adjustable spool stop is arranged for contact with the spool 121 to establish an axial location of the adjustable end 129 of the travel range 127 of the spool 121. The control 220 is associated with the spool stop 229 to move the spool stop 229 axially relative to the spool 121 to selectively change the axial location of the adjustable end 129 in response to actuation of the control 220, thereby adjusting the flow rate setting of the valve 100.

Exemplarily, the control 220 is a rotary control rotatable to adjust the amount of allowed spool travel 127. As such, the flow rate setting adjustment device 200 is configured to adjust the flow rate setting of the hydraulic flow control valve 100 by adjusting the amount of travel allowed for the spool 121 in response to axial position adjustment of the spool stop 229 caused by screw-type movement of the rotary control 220 (such screw-type movement being relative to the axis 130). Screw-type movement of the rotary control moves the spool stop 229 axially relative to the spool 121 to change the axial location of the adjustable end 129 of the spool travel range 127. A predetermined angle of rotation of the rotary control 220 results in a predetermined change in the amount of allowed spool travel. The rotary control is, for example, configured as a rotary knob rotatable by a person (e.g., vehicle operator, end user) to select the flow rate setting that matches the operational flow requirement of the hydraulic attachment selected for use.

Referring to FIGS. 3 and 7, the flow rate setting adjustment device 200 has a body 240. The body 240 includes an external thread B which interfaces with a matching internal thread on the valve housing 241. The body 240 is appended to the valve housing 241 so as to be fixed against movement relative thereto.

The spool stop 229 extends through the body 240 so as to be mounted for axial movement therein. The body 240 includes a bore 242 through which a seal piston 230 of the spool stop 229 slides. An O-ring 252 fitted in a circumferential groove 231 formed in the seal piston 230 (FIG. 4) slidingly contacts the bore 240 to establish a sealed connection therebetween. A frusto-conical seat 243 of the body 240 is configured for mating contact with a frusto-conical shoulder 245 of a calibration set screw 250 of the spool stop 229 to limit axial movement of the spool stop toward the spool 121. The calibration set screw 250 is fixed to the piston 230 for movement therewith.

Referring to FIGS. 3, 5, and 6, the control 220 is threaded to the calibration set screw 250 and the body 240. A radial, end wall 260 of the control 220 includes an internal thread A' that interfaces with a matching external thread A" of the calibration set screw 250 of the spool stop 229. A lock or jam nut 251 is attached to the set screw 250 of the spool stop 229 and in contact with the end wall 260 to prevent movement of the spool stop 229 relative to the control 220. A generally cylindrical side wall 261 extending axially from the end wall 260 includes at least one internal thread C' that interfaces with at least one matching external thread C" of the body 240.

Figure 11:
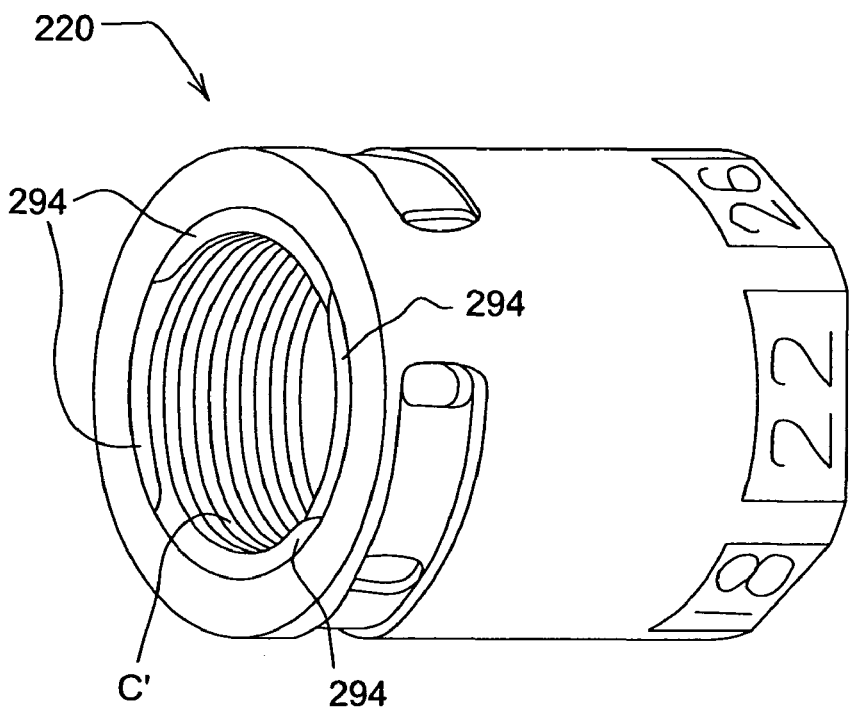
FIG. 11 is a perspective view showing the rotary control with a multi-start thread.
Figure 12:
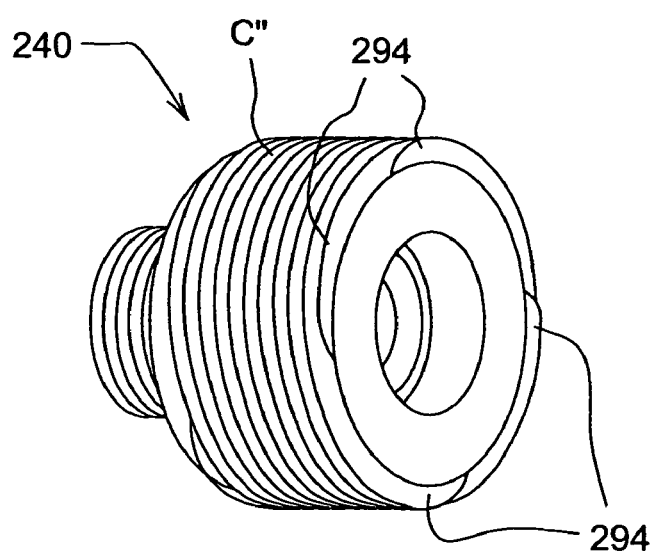
FIG. 12 is a perspective view showing a male component with a multi-start thread to receive the multi-start thread of the rotary control.

Each thread C', C" is configured, for example, as a multistart thread enabling relatively large axial movement of the rotary control 220 for a given amount of angular movement of the rotary control 220, as shown, for example, in FIGS. 11 and 12. Exemplarily, each thread C', C" has four thread elements 294 extending helically together, the four helical thread elements starting at 90-degree intervals about the respective component 220, 240, as represented in FIGS. 6, 7, and 10. In an example, the control will move axially 0.42 inches with one turn of the control. This may be obtained by use of 1.375 inch diameter threads with four thread starts, the threads having a 0.105 inch pitch distance between adjacent thread elements.

It is within the scope of this disclosure for each thread C', C" to have more or less thread elements (i.e., more or less than four thread elements). For example, each thread C', C" may have five helical thread elements such that each thread C', C" is a five-start thread. In such a case, a 0.42 inch lead for the thread C', C" would give rise to a 0.084 inch thread pitch (0.42 inch lead/5 thread elements=0.084 inch thread pitch). In another example, each thread C', C" may have three helical thread elements, a 0.42 inch lead for the thread C', C" would give rise to a 0.14 inch thread pitch (0.42 inch lead/3 thread elements=0.14 inch thread pitch).

As the control 220 is rotated in either direction indicated by double-headed arrow 244 (i.e., clockwise or counter-clockwise) about axis 130, rotative engagement between threads C', C" cause the control 220 to advance toward or retract away from the valve housing 241. Such axial movement of the control 220 causes the calibration set screw 250 to advance or retract via the threads A', A" either extending the piston 230 toward the spool 121 or retracting the piston 230 away from the spool 121. As the piston 230 advances or retracts, the axial location of the adjustable end 129 of the spool travel range 127 is changed, thereby adjusting the amount of travel allowed for the spool 121 and, thus, the flow rate setting of the valve 100. A drain hole 276 is formed in the end wall 260 to allow water to drain to prevent freezing in cold weather.

The flow rate setting adjustment device 200 may include a means for immediately determining when predetermined flow rate settings are attained comprising a flow rate setting indicator 280 arranged for screw-type movement with the rotary control 220 to indicate the flow rate setting upon axial position adjustment of the spool stop 229 caused by screw-type movement of the rotary control 220. The indicator 280 may provide a tactile, visual, and/or audible indication or other indication of the flow rate setting established by the device 200.

The indicator 280 may be configured so as to provide tactile feedback of the flow rate settings of the valve 100 by virtue of a stop arrangement 282 of the indicator 280 establishing predetermined helically-spaced stop points corresponding respectively to the flow rate settings of the valve 100. The arrangement 282 includes a yieldable detent 210 and a number of helically-spaced rotation stops 221 formed on the side wall 261 of the control 220. The detent 210 is configured, for example, as spring-loaded pin assembly appended to the housing 241. The detent 210 cooperates with the rotation stops 221 to retain the rotary control 220 in a selected angular position. Each rotation stop 221 corresponds to a discrete predetermined flow rate setting. Each stop 221 is, for example, a recess formed in an outer surface of the side wall 261 and configured to a receive a radially extending spring-biased pin 212 of the detent 210. Reception of the pin 212 into a particular rotation stop 221 establishes a corresponding flow rate setting. Each rotation stop 221 provides not only measured stops but also tactile feedback to the operator that an adjustment has been made.

The flow rate setting indicator 280 may include visual indicia or markings 270 on the rotary control 220. Illustratively, visual indicia 270 in the form of, for example, numerical markings corresponding to discrete predetermined flow rate settings (e.g., 9, 18, 22, 26, 30, 34, each in gallons per minute) may be formed on the outer surface of the control 220 (FIG. 5) and/or the valve housing 241 or body 240.

In some examples, the device 200 may be configured so as to sense the amount of axial movement of the spool stop 229 and to signal that movement via electronic or other means to the indicator 280.

Referring to FIGS. 8-10, there is shown an alternative embodiment of the control 220 with a helical groove 272. The recesses 221 are formed in and spaced along the helical groove 272.

The helical groove 272 comprises first and second closed ends 274 spaced helically apart from one another. Each of the closed ends 274 is arranged to contact the pin 212 of the detent 210 to prevent screw-type movement of the control 220 beyond that closed end 274. If the control 220 were allowed to over-rotate, the visual indicia 270 would not accurately indicate the flow rate setting. The helical groove 272 with its closed ends 274 thus acts as a rotation limiter for limiting screw-type movement of the control 220. More particularly, the rotation limiter limits screw-type movement of the rotary control to no more than one revolution (e.g., 300 degrees) so as to prevent over-rotation of the rotary control 220. It is within the scope of this disclosure for the rotary control to rotate more than one revolution (e.g., two revolutions) such as by use of a single-start thread on the rotary control and body.

The outer surface of the control 220 may include a textured portion 278 for use by the operator to facilitate turning of the control 220, as shown, for example, in FIG. 9. Illustratively, the textured portion 278 is knurled.

During assembly of the valve 100, the flow rate setting adjustment device 200 may be calibrated to account for manufacturing tolerance stack-up in the various components of the device 200. During calibration, the lock 251 is removed from the set screw 250 and the set screw 250 is adjusted via threads A', A" to position the piston 230 axially so as to achieve the desired flow rate settings upon screw-type movement of the control 220.

In use, an operator uses the flow rate setting adjustment device 200 to set the valve 100 to a desired flow rate setting. To do so, the operator may grip the control 220 and rotate it until the flow rate setting indicator indicates the flow rate setting required for the particular hydraulic attachment attached to the vehicle. If the hydraulic attachment is changed to a different attachment requiring a different flow rate setting, the operator simply adjusts the control 220 to set the valve 100 at the new flow rate setting.

The valve 100 is, for example, a pressure-compensate hydraulic flow control valve, although it need not be configured so as to be pressure-compensated.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A hydraulic flow control valve, comprising:
a spool; and
a flow rate setting adjustment device comprising a rotary control, a spool stop, and a flow rate setting indicator, the flow rate setting adjustment device configured to adjust a flow rate setting of the hydraulic flow control valve by adjusting the amount of travel allowed for the spool in response to axial position adjustment of the spool stop caused by screw-type movement of the rotary control, the flow rate setting indicator arranged for screw-type movement with the rotary control to indicate the flow rate setting upon the axial position adjustment of the spool stop caused by the screw-type movement of the rotary control, the flow rate setting indicator including a yieldable detent and screw-type movement stops formed on the rotary control and spaced helically apart from one another for contact with the yieldable detent to stop screw-type movement of the rotary control, each screw-type movement stop corresponding to a predetermined flow rate setting for the hydraulic flow control valve.

2. The hydraulic flow control valve of claim 1, wherein each screw-type movement stop is located in a helical groove of a generally cylindrical side wall of the rotary control, the helical groove receiving the yieldable detent.

3. The hydraulic flow control valve of claim 2, wherein each screw-type movement stop is a recess configured to receive the yieldable detent and formed in the helical groove.

4. The hydraulic flow control valve of claim 2, wherein the helical groove comprises a first closed end and a second closed end spaced helically from the first closed end, and each of the first and second closed ends is arranged to contact the yieldable detent to prevent screw-type movement of the rotary control beyond that closed end.

5. The hydraulic flow control valve of claim 1, comprising a valve housing in which the spool is positioned for movement, wherein the flow rate setting adjustment device comprises a body appended to the valve housing, the spool stop extends through the body into the valve housing, the rotary control is fixed to the spool stop and threaded to the body for screw-type movement of the rotary control relative to the body to move the spool stop axially relative to the body, and the detent is appended to the valve housing and comprises a spring-biased pin extending radially toward a generally cylindrical side wall of the rotary control on which the screw-type movement stops are formed.

6. The hydraulic flow control valve of claim 5, wherein the rotary control comprises an end wall from which the side wall extends axially, the end wall is threaded to the spool stop, the side wall is threaded to the body, and the flow rate setting adjustment device comprises a lock attached to the spool stop and in contact with the end wall to prevent movement of the spool stop relative to the control.

7. The hydraulic flow control valve of claim 1, wherein the flow rate setting indicator comprises visual indicia on the rotary control.

8. The hydraulic flow control valve of claim 1, wherein the flow rate setting indicator is configured to provide tactile feedback upon a flow rate setting adjustment.

9. The hydraulic flow control valve of claim 1, wherein the flow rate setting adjustment device comprises a rotation limiter for limiting screw-type movement of the rotary control.

10. The hydraulic flow control valve of claim 9, wherein the rotation limiter limits screw-type movement of the rotary control to no more than one revolution.

11. The hydraulic flow control valve of claim 1, wherein the spool stop is attached to the rotary control in a manner that will allow movement of the spool stop relative to the rotary control for calibration of the hydraulic flow control valve.

12. The hydraulic flow control valve of claim 11, wherein the flow rate setting adjustment device comprises a lock, the rotary control and the spool stop are threaded to one another, and the lock is arranged to prevent relative rotation between the rotary control and the spool stop.

13. A hydraulic flow control valve, comprising:
a spool, and
an adjustment device for achieving any one of a plurality of predetermined flow rates comprising a rotary control and a spool stop, the adjustment device configured to adjust a flow rate setting of the hydraulic flow control valve by adjusting the amount of travel allowed for the spool in response to axial position adjustment of the spool stop caused by screw-type movement of the rotary control, the adjustment device comprising a means for immediately determining when the any one of a plurality of predetermined flow rates is achieved.

* * * * *